United States Patent
Kydd

[11] 3,848,307
[45] Nov. 19, 1974

[54] MANUFACTURE OF FLUID-COOLED GAS TURBINE AIRFOILS

[75] Inventor: Paul H. Kydd, Scotia, N.Y.

[73] Assignee: General Electric Company, Schenectady, N.Y.

[22] Filed: Sept. 24, 1973

[21] Appl. No.: 400,137

Related U.S. Application Data

[63] Continuation-in-part of Ser. No. 240,616, April 3, 1972, abandoned.

[52] U.S. Cl.......... 29/156.8 B, 29/156.8 H, 29/489, 29/500, 29/503
[51] Int. Cl................. B21k 3/04, B23p 15/04
[58] Field of Search..... 29/156.8 H, 156.8 B, 527.2, 29/489, 500, 503

[56] References Cited
UNITED STATES PATENTS

| | | | |
|---|---|---|---|
| 2,369,537 | 2/1945 | Crawford | 29/489 |
| 2,401,483 | 6/1946 | Hersel et al. | 29/503 X |
| 2,641,439 | 6/1953 | Williams | 29/156.8 B X |
| 2,641,440 | 6/1953 | Williams | 29/500 X |
| 2,648,520 | 8/1953 | Schmitt | 29/156.8 H |
| 2,807,437 | 9/1957 | Roush | 29/500 X |
| 2,946,681 | 7/1960 | Probst et al. | 29/156.8 H |
| 3,501,013 | 3/1970 | Modser | 29/489 X |

FOREIGN PATENTS OR APPLICATIONS

| | | | |
|---|---|---|---|
| 800,414 | 8/1958 | Great Britain | 29/156.8 B |
| 84,210 | 2/1957 | Netherlands | 29/156.8 B |

Primary Examiner—Andrew R. Juhasz
Assistant Examiner—Ronald J. Shore
Attorney, Agent, or Firm—Leo I. MaLossi; Joseph T. Cohen; Jerome C. Squillaro

[57] ABSTRACT

A filler material is disposed in the channels recessed in the surface of a turbine bucket core. A porous turbine bucket skin is deposited over the surface of the bucket core covering the channels. The composite is then heated to a temperature above the melting point of the filler material (e.g., copper). When the filler material melts, it is drawn into the porous skin by capillary action serving, in a single operation, to empty the channels and to bond the porous skin material both to itself and to the areas of the bucket core between the channels.

6 Claims, 2 Drawing Figures

MANUFACTURE OF FLUID-COOLED GAS TURBINE AIRFOILS

BACKGROUND OF THE INVENTION

This is a continuation-in-part of application S.N. 240,616 - Kydd, filed Apr. 3, 1972 and now abandoned.

Structural arrangements for the liquid cooling of gas turbine blades are shown in U.S. Pat. Nos. 3,446,481 - Kydd and 3,446,482 - Kydd. The manufacture of air-cooled gas turbine blades is described in U.S. Pat. No. 2,641,440 - Williams.

U.S. Pat. No. 3,619,076 - Kydd describes turbine blade construction consisting of a central airfoil-shaped spar clad with a sheet of metal having a very high thermal conductivity e.g., copper. The cladding sheet has grooves recessed in the sheet face adjacent the spar, which grooves together with the smooth surface of the spar define coolant passages distributed over the surface of the turbine blade.

The aforementioned patents are incorporated by reference.

SUMMARY OF THE INVENTION

The manufacture of a fluid-cooled gas turbine bucket is described wherein a turbine bucket core having channels recessed in the surface thereof is provided with a skin in the following manner. First, a filler material is introduced into and fills up the channels. Next, a porous skin of erosion-resistant material is applied thereover by some deposition process, e.g., flame spraying a metal skin. The melting point of the filler material is lower than the melting point of the skin material. Thereafter, the composite is heated to a temperature above the melting point of the material filling the channels whereupon the filler material melts and is drawn into the porous skin by capillary action. Thus, in a single operation (a) the channels are emptied and (b) the filler material is disposed where it will bond (by brazing) the deposited skin material both to itself and to the bucket core at the areas of contact therewith. These combined actions serve to create and define the requisite passages for the transport of coolant beneath the bucket skin.

BRIEF DESCRIPTION OF THE DRAWING

The exact nature of this invention as well as objects and advantages thereof will be readily apparent from consideration of the following specification relating to the annexed drawing in which.

DESCRIPTION OF THE PREFERRED EMBODIMENT

Figure 1:
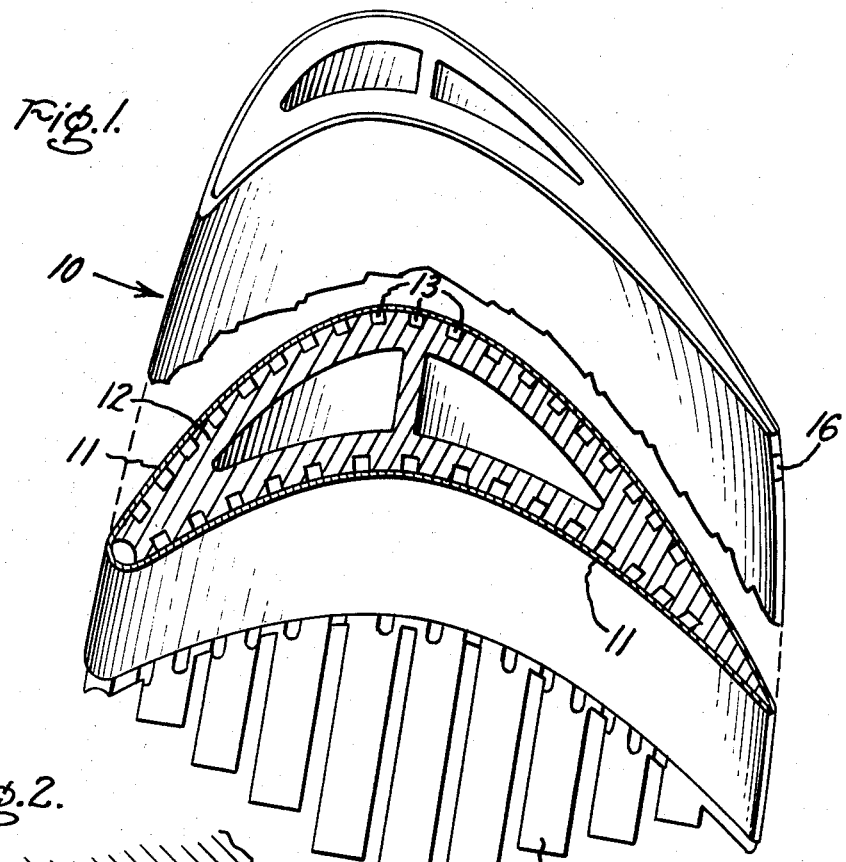
FIG. 1 is a three-dimensional view partially in section displaying a turbine bucket core having recessed grooves therein and a skin deposited thereover and adhered thereto and FIG. 2 shows such a bucket in place in a rotor disk rim with the platform removed.
Figure 2:
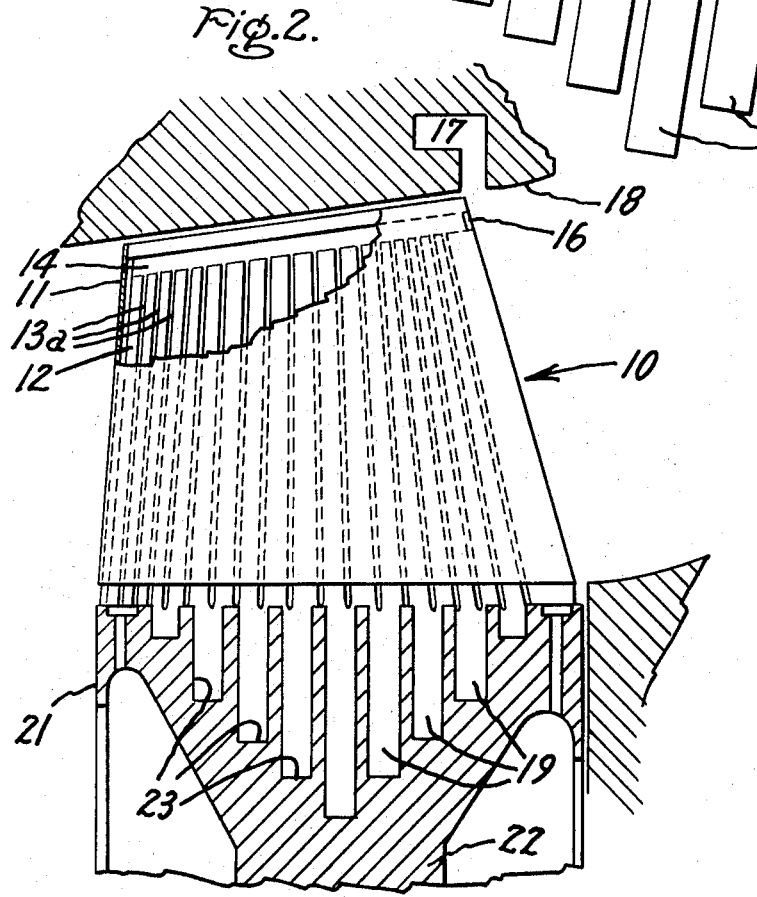

Turbine bucket 10 consists of a thin metallic skin 11 deposited over investment cast hollow core 12 having integral spanwise-extending grooves 13a recessed in the surface thereof. The rectangular cooling channels 13 defined by skin 11 and grooves 13a conduct cooling fluid, e.g., a liquid, therethrough at a uniform depth beneath skin 11. At the upper ends thereof the substantially rectangular cooling channels 13 on the pressure side of bucket 10 are in flow communication with and terminate at manifold 14 recessed into core 12. On the suction side of bucket 10 the substantially rectangular cooling channels 13 are in flow communication with, and terminate at, a similar manifold (not shown) recessed into core 12. Near the trailing edge of bucket 10, a crossover conduit (not shown) connects the manifold on the suction side with manifold 14.

Open-circuit cooling from the interconnected manifolds is insured by unobstructed opening 16, which provides for the exit of the heated cooling fluids from manifold 14 at the trailing edge of bucket 10 as shown. Annular collection slot 17 formed in casing 18 receives the centrifugally directed ejected fluid for the eventual recirculation or disposal thereof.

In one useful bucket root configuration, the root end of core 11 consists of a number of finger-like projections, or tines, 19 of varying length. Rim 21 of turbine disk 22 has grooves 23 machined therein extending to various depths and widths matching the different lengths and widths of bucket tines 19 such that tines 19 will fit snuggly into the completed grooves 23 in an interlocking relationship. Once the proper fit has been obtained, the appropriate amount of brazing alloy is placed in each groove 23 and the buckets are inserted and held in fixed position by a fixture. Conventional brazing alloys having melting points in the 700°–1,100° C range may be used for bucket retention, the bucket retention braze selected having a melting temperature lower than the bucket skin braze material described hereinbelow. Thereafter, the assembly (the rim with all of the buckets properly located) is furnaced-brazed to provide an integral structure.

The numerous small grooves 13a for forming cooling channels 13 are spaced close together and are located at a uniform depth beneath the outer surface following a complex three-dimensional form from the root of bucket core 12 to the bucket tip manifolds. For this reason, it is impossible to simply drill cooling channels 13. In order to provide these cooling channels the airfoils must be assembled from core 12 containing the recessed grooves 13a and a lightly bonded skin 11 to define and provide isolation of each cooling channel 13. This skin must conform to the complex shape of bucket 10 and must be of uniform thickness.

In the practice of this invention grooves 13a may be formed in the surface of core 12 during the casting thereof, for example. The surface of core 12 is then cleaned as by sandblasting and ultrasonic cleaning. Grooves 13a are then filled with appropriate filler material. The lands (surfaces between grooves 13a) are then cleaned to remove any filler material. The altered surface of core 12 is cleaned as before. Skin 11 may then be formed by depositing the skin material over the smooth cleaned external surface of core 12 so presented. The nature of the filler material must be such that the melting temperature thereof is lower than the melting temperature of the skin material. The interrelationship of the filler and skin materials must be such that, when melted, the filler will leave the channels and enter the porous skin by capillary action, bond skin particles together and bond the skin to the bucket core area (where the filled recessed do not occur). The resultant skin will be hard, uniform in thickness, tightly bonded to core 12, erosion resistant and of high thermal conductivity. The channels 13 are so small in cross-section (about 0.050 inch =0.100 inch maximum) that the molten filter does not run down the channels before the capillary action occurs.

The material of which skin 11 is to be made is first selected so as to provide the properties of hardness, erosion and corrosion resistance and the capability for being applied as a porous layer, e.g., by flame spraying. Next, a filler material is selected having the capability of bonding the skin material to itself and to core 12 and, as well, to leave channels 13 by capillary action to enter into porous skin 11. The minimum thickness of this deposited layer 11 must be sufficient so that the porous volume thereof will accommodate the total volume of filler and will, thereby, empty the channels by capillary action. Empty channels are, of course, required to meet predicted design coolant transport capability thereby insuring requisite cooling over all areas of the airfoil surface.

Determination of a suitable thickness for porous layer 11 is readily accomplished as is illustrated by the following examples:

EXAMPLE 1

A piece of X-15 (a maraging steel manufactured by Carpenter Steel Co.) provided with straight grooves on one surface thereof was used as the substrate. The grooved surface was sandblasted and then cleaned ultrasonically in water. The surface was flame sprayed with copper to fill the grooves and then ground to a flush surface of copper strips separated by lands of X-15. This surface was then sandblasted and cleaned ultrasonically in water. After drying, the piece was flame sprayed with X-15 to provide a porous layer having a thickness of about 0.012 inch – 0.014 inch. Thereafter, the coated piece was fired in dry hydrogen for 30 minutes at 2,250° F. Examination of the piece after cooling showed that copper had saturated the X-15 layer, which looked very clean and bright. However, only one-half the number of grooves had been emptied of copper.

EXAMPLE 2 Four pieces of X-15 provided with straight grooves on one surface were used for similar testing with each of four different metals; X-15, nickel, 347 stainless steel and Metcoloy No. 2 (hardened stainless steel manufactured by Metco Co.). The substrates were prepared as in EXAMPLE 1 with copper filling in the grooves. Each piece was then flame sprayed with one of the above four metals to provide a porous layer about 0.030 inch thick. The coated pieces were then fired in dry hydrogen for 30 minutes at 2250° F. After cooling, the pieces were examined and all the holes were found to be open in three of the four pieces. In the case of the porous nickel coated piece only one of two holes gave indications of being open.

In addition to establishing that by utilizing an adequately thick coating for porous layer 11, the filler will be emptied from the channels, these tests have also shown that another property of the porous layer/filler material combination is required. Thus, although the filler material must wet the material forming the porous layer (and the bucket core material as well), the material forming the porous layer and any metallic filler material must not actively alloy with each other to any great extent (as is the case with nickel and copper or with nickel and silver).

The filler material and the skin material are selected as a combination in which the skin material will provide the desired surface properties for the turbine bucket and the filler material (copper, copper alloys, other melting high thermal conductivity alloys) will wet, but not actively alloy with, both the skin material and the bucket core material in order to provide brazing therefor. So long as these criteria are met, the porous skin deposit may be metallic (e.g., steel alloys) or nonmetallic (e.g., tungsten carbide).

Coating 11 may be applied by flame-spraying or plasma spray techniques, whichever provides optimum results with the desired material. Final firing to remove the fill material from channel 13 can be done in an atmosphere of hydrogen or carbon monoxide to provide a fluxing action and assure wetting of the porous skin material by the molten filler.

Thereafter, the only additional operation required is to finish the exterior of the bucket to a smooth surface.

The method of this invention as defined in the following claims is intended to apply to the preparation of both gas and liquid-cooled gas turbine buckets. The term "grooves" is intended to encompass all recessed channelling configurations ultimately functioning as coolant-transporting sub-skin passages in the completed blade. Thus, such grooves may be straight or curved (as in the case of the serpentine cooling channels in U.S. Pat. Application S.N. 345,538 - Grondahl, filed Mar. 28, 1973 and assigned to the assignee of the instant invention) and may include recesses for manifolding to receive flow from passages connected thereto.

What I claim as new and desire to secure by Letters Patent of the United States is:

1. In the method for applying a continuous skin over a turbine bucket core having a plurality of grooves recessed in the surface thereof and separated by ridges of the core material, in which method the grooves are filled with a first material, said bucket core surface is covered with at least one rigid layer of another material to form the bucket skin and said first material is then removed completing conversion of each groove to an empty enclosed passage for receiving, transporting and discharging coolant, the improvement comprising the steps of, a. selecting one material for the bucket skin, said material being capable of deposition over the bucket core as a porous layer having structural integrity, b. selecting a second material for temporarily occupying the grooves of said bucket core, said second material having a melting temperature lower than the melting temperature of said one material, said one material and the bucket core material being wet by, but not actively alloying with said second material when molten and said second material being capable of bonding said one material to itself and to said bucket core, c. disposing said second material in each of said grooves to a level approximately flush with the outer surface of said bucket core, d. depositing a porous coating of said one material over said bucket core and over the deposits of said second material and e. heating the composite so formed to a temperature above the melting point of said second material and below the melting temperature of said one material until said second material melts and is drawn from said grooves into the porous coating by capillary action to empty each of said grooves, to bond said one material together and also to bond said one material to the surfaces of said bucket core in contact therewith.

2. The improvement in claim 1 wherein the second material is copper.

3. The improvement of claim 1 wherein the one material is the same as the material of which the bucket core is made.

4. The improvement of claim 1 wherein the one material is metallic.

5. The improvement of claim 1 wherein the one material is deposited by flame spraying.

6. The improvement of claim 1 wherein the heating of the composite is conducted in a reducing atmosphere.

* * * * *